UNITED STATES PATENT OFFICE.

WILHELM PICKHARDT, OF NEW YORK, AND HERMANN ENDEMANN, OF BROOKLYN, N. Y., ASSIGNORS TO WILHELM PICKHARDT AND ADOLF KUTTROFF, BOTH OF NEW YORK, N. Y.

MEDICAL COMPOUND.

SPECIFICATION forming part of Letters Patent No. 254,097, dated February 21, 1882.

Application filed December 6, 1881. (Specimens.)

*To all whom it may concern:*

Be it known that we, WILHELM PICKHARDT, a citizen of the United States, residing at New York, in the county and State of New York, and HERMANN ENDEMANN, a citizen of the United States, residing at Brooklyn, in the county of Kings and State of New York, have invented new and useful Improvements in Medical Compounds, of which the following is a specification.

This invention relates to a medical compound which is obtained by the action of hydrochloric acid on Skraup's chinoline.

In carrying out our invention we take the chinoline of Skraup, or we prepare such artificial chinoline according to the Patent No. 241,738, granted to Zdenko H. Skraup, May 17, 1881, and then we free the same from the impurities mixed therewith by treating it with tartaric acid, whereby a tartrate of chinoline is obtained, and then liberating from this salt the chinoline by treating its aqueous solution with caustic alkalies, as fully described in another application for a patent bearing even date with this. After the chinoline has been freed from impurities we dissolve the same in a slight excess of aqueous hydrochloric acid, and then evaporate the solution on a water-bath until no more vapors of hydrochloric acid are given off. A colorless white crystalline mass is thus obtained, which forms our hydrochloride of chinoline.

If impure chinoline is used and treated as above described, a thick sirup is obtained, which, on cooling, becomes crystalline and is colored. The impure crystals thus obtained are exceedingly hygroscopic, while the salt obtained from previously purified chinoline is far less hygroscopic, and remains white in contact with the air.

Potash added to the aqueous solution of our hydrochloride of chinoline produces a white turbidity, caused by the liberation of chinoline. The chinoline thus liberated collects after standing for some time in oily drops and the solution becomes clear. This solution contains, then, the potassium chloride wherein the chlorine may be found by the use of reagents in the usual manner.

Our hydrochlorate of chinoline is perfectly white and free from lepidine. The chinoline liberated from our hydrochlorate by potash is colorless, and does not change when exposed to the air.

The hydrochlorate of chinoline described by Donath and in other publications is prepared from chinoline which is obtained from cinchonine, and it is well known that such chinoline contains lepidine and other bases of the chinoline series, and the salts prepared from such chinoline cannot be used with safety for medical purposes.

What we claim as new, and desire to secure by Letters Patent, is—

The hydrochlorate of chinoline prepared from Skraup's chinoline in the manner hereinbefore described, and having the characteristics above set forth.

In testimony whereof we have hereunto set our hands and seals in the presence of two subscribing witnesses.

WM. PICKHARDT. [L. S.]
H. ENDEMANN. [L. S.]

Witnesses:
W. HAUFF,
E. F. KASTENHUBER.